J. W. AYLSWORTH.
COMPOSITION FOR DUPLICATE SOUND RECORDS.
APPLICATION FILED MAY 25, 1907.
1,017,032.
Patented Feb. 13, 1912.
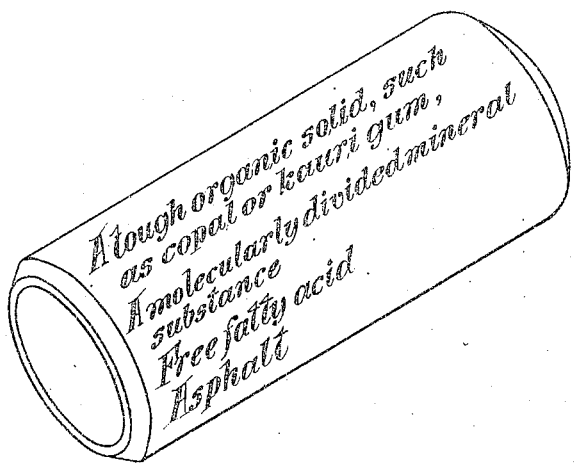

UNITED STATES PATENT OFFICE.

JONAS W. AYLSWORTH, OF EAST ORANGE, NEW JERSEY, ASSIGNOR, BY MESNE ASSIGNMENTS, TO THOMAS A. EDISON, INCORPORATED, OF WEST ORANGE, NEW JERSEY, A CORPORATION OF NEW JERSEY.

COMPOSITION FOR DUPLICATE SOUND-RECORDS.

1,017,032.　　　　　Specification of Letters Patent.　　Patented Feb. 13, 1912.

Application filed May 25, 1907.　Serial No. 375,726.

*To all whom it may concern:*

Be it known that I, JONAS W. AYLSWORTH, a citizen of the United States, residing at 223 Midland avenue, East Orange, county of Essex, and State of New Jersey, have invented certain new and useful Improvements in Composition for Duplicate Sound-Records, of which the following is a description.

My invention relates to improvements in compositions for duplicate sound records adapted to be made by casting, pressing or molding processes, but the composition has been expressly designed for use in connection with processes in which the record during its formation is subjected to considerable pressure, so as to eliminate air bubbles, and particularly the pressure obtained by centrifugal force, as I disclose, for example, in my Patent No. 855,605 dated June 4, 1907.

Where the composition is employed in connection with the manufacture of disk records the usual pressing process can be performed with good results.

The object of the invention is to provide a composition which while possessing the usual attributes of a satisfactory material for the purpose, presents an excessively fine smooth surface so as to eliminate foreign noises, while at the same time the composition is able to resist to a remarkable extent the wearing or abrasive action of the reproducing stylus. This object is obtained by incorporating an inert mineral substance with a tough organic solid in such a way that the mineral substance will remain in the solid suspended as a precipitate of almost molecular fineness. I accomplish this result by forming the inert substance *in situ* within the molten or plastic organic material by the action of a suitable precipitating agent, preferably in gaseous form.

Broadly stated, the improved composition is made by adding to a suitable organic material or mixtures thereof, a fatty acid salt or salts of the particular mineral substance or substances whose insoluble sulfid, chlorid, fluorid, or other salt it is desired to incorporate in the composition, and by then treating the composition with a suitable precipitating agent, preferably in gaseous form, by which the fatty acid salt will be converted into the particular inert mineral salt that is desired. This reaction results in the formation within the composition of a fatty acid which may be again converted into the fatty acid salt of the desired metal or metals, and the latter may be again acted upon by the precipitating agent which will produce additional quantities of the desired insoluble sulfid, chlorid, fluorid, or other salt; or, if desired, the fatty acid resulting from the first or succeeding reactions may be allowed to remain in the composition or it may be removed in any suitable way, as I will hereafter explain.

As an example of a suitable composition which may be made embodying the present invention, I may take copal or kauri gum, 50 parts by weight, and stearate of lead, 100 parts by weight, although these proportions may be widely varied. These ingredients are melted together and maintained in a molten condition by heat. If it is desired to convert the stearate of lead into an insoluble sulfid of lead, sulfureted hydrogen gas may be now injected into the molten mass, the reaction resulting in the production of lead sulfid and stearic acid. If it is desired to convert the stearate of lead into an insoluble chlorid of lead, hydrochloric acid gas may be used in the same way as a precipitating agent, forming lead chlorid and stearic acid. If it is desired to convert the stearate of lead into an insoluble fluorid of lead, hydrofluoric acid gas may be used as the precipitating agent, resulting in the production of the insoluble lead fluorid and stearic acid. Other precipitating agents may be used, either in gaseous or liquid form, but preferably the former, for the production of other insoluble metallic salts. After the reaction has been completed a hydrate or oxid or carbonate of the metal used (in the present case, hydrate or oxid or carbonate of lead) is added to the melted mass, resulting in a combination with the free fatty acid to form an additional quantity of the fatty acid salt, or in the present case, stearate of lead. This reaction in the case of the hydrate or oxid will result in the production of water as a by-product, and in the case of the carbonate will result in the production of carbonic acid as a by-product. The fatty acid salt (stearate of lead) thus produced may be again treated by the desired precipitating agent so as to form an additional quantity of the desired insoluble metallic salt, and these operations may be repeated until the required amount of the inert mineral substance is produced *in situ* within the mass. The free fatty acid, such as stearic acid, which remains in the mass after the first or subsequent reactions may be allowed to remain in the composition, or this fatty acid may be removed by distillation by superheated steam *in vacuo*, or by extraction by means of a suitable solvent, such as alcohol or gasolene.

It will be understood of course that instead of adding to the organic material a fatty acid salt in the first instance, the same result will be obtained if stearic acid or other free fatty acid is first added and is then converted into a fatty acid salt by the addition of a hydrate or oxid or carbonate of the desired metal, after which the precipitation of the metallic salt will be effected, as explained.

Instead of using copal or kauri gum, as explained, other tough organic materials such as shellac may be used, or combinations of such materials.

It will also be understood that instead of using stearic acid, other suitable free fatty acids may be employed, such as palmitic acid or montan acid.

It will also be understood that instead of using a fatty acid salt of lead, or a hydrate, oxid or carbonate of lead, as explained, corresponding compounds of other metals may be employed, such as stearate, palmitate or montanate of zinc, or hydrate, oxid or carbonate of zinc, or the corresponding salts of other metals, such as iron or nickle or copper.

Whichever materials may be used, the resulting compositions will be formed of a suitable organic material, such as copal gum or kauri gum or shellac, and a large proportion of an inert metallic salt, such as sulfid, chlorid or fluorid of lead, the latter existing in a condition of almost molecular fineness, making a composition with an excessively smooth surface, of great hardness and not interfering with its desirable molding properties, especially if the duplication is effected by the process disclosed in my patent, above referred to.

If desired, the composition may also contain free fatty acid, as above explained, and where cheapness is a desideratum, asphalt may be introduced in proportions up to 50% or more, by melting and thoroughly incorporating the same with the composition. With such compositions, asphalt is preferably miscible. When asphalt is used, a grade should be selected of as pure a type as possible, such as Gilsonite or Egyptian asphalt.

Where an organic material is used, or combinations thereof, which cannot become readily melted, but merely become plastic by heat, the composition can be made by the use of heated mixing rolls, which effect the intimate admixture of the ingredients and which are operated in an atmosphere of the desired precipitating agent, such as sulfureted hydrogen gas, hydrochloric acid gas or hydrofluoric acid gas, but the reactions will be the same as when the material is in a molten condition.

I prefer to make use of the gaseous precipitating agent as explained, as in that way the insoluble metallic salt in more finely subdivided condition will be formed *in situ* within the mass, but a liquid precipitating agent may be used, although at a sacrifice of the fineness of texture of the composition.

Reference is hereby made to the accompanying drawings, showing a phonograph record having inscribed thereon the elements of my improved composition. It is to be understood, however, that my invention is not limited to a composition made up of these precise ingredients, its scope being defined by the claims.

I do not claim herein the particular process followed in manufacturing my improved composition, as I shall make the same the subject of another application for Letters Patent, but What I do claim and desire to secure by Letters Patent is as follows:—

1. An improved composition for duplicate sound records, comprising an organic solid and an inert metallic salt chemically precipitated *in situ* and suspended therein and of excessive fineness, substantially as described.

2. An improved composition for duplicate sound records, comprising an organic solid and an inert lead salt chemically precipitated *in situ* and suspended therein and of excessive fineness, substantially as described.

3. An improved composition for duplicate sound records, comprising an organic solid and a lead sulfid chemically precipitated *in situ* and suspended therein and of excessive fineness, substantially as described.

4. An improved composition for duplicate sound records, comprising an organic solid and an inert substance chemically precipitated *in situ* and suspended therein and of excessive fineness, and free stearic acid, substantially as described.

5. An improved composition for duplicate sound records, comprising an organic solid and an inert substance chemically precipitated *in situ* and suspended therein and of excessive fineness, and asphaltum, substantially as described.

6. An improved composition for duplicate sound records, comprising an organic solid and an inert metallic salt chemically precipitated *in situ* and suspended therein and of excessive fineness, and asphaltum, substantially as described.

7. An improved composition for duplicate sound records, comprising an organic gum and an inert substance chemically precipitated *in situ* and suspended therein and of excessive fineness, substantially as described.

8. An improved composition for duplicate sound records, comprising an organic gum and a metallic salt chemically precipitated *in situ* and suspended therein and of excessive fineness, substantially as described.

9. An improved composition for sound records comprising an organic solid and an inert substance chemically precipitated *in situ* and suspended therein and of excessive fineness, substantially as described.

This specification signed and witnessed this 7th day of May, 1907.

JONAS W. AYLSWORTH.

Witnesses:
FRANK L. DYER,
FRANK D. LEWIS.